United States Patent [19]
Partridge

[11] Patent Number: 6,165,367
[45] Date of Patent: Dec. 26, 2000

[54] METHOD FOR REMOVING A HEAVY METAL FROM A WASTE STREAM

[75] Inventor: Jerry A. Partridge, Richland, Wash.

[73] Assignee: Siemens Power Corporation, Richland, Wash.

[21] Appl. No.: 07/762,298

[22] Filed: Sep. 19, 1991

[51] Int. Cl.$^7$ ...................................................... C02F 1/42

[52] U.S. Cl. .......................... 210/670; 210/682; 210/688

[58] Field of Search .................................. 210/670, 682, 210/688, 912–914, 674; 521/26

[56] References Cited

U.S. PATENT DOCUMENTS

| | | | |
|---|---|---|---|
| 2,780,514 | 2/1957 | Lutz | 23/14.5 |
| 3,899,472 | 8/1975 | Aya et al. | 260/80.78 |
| 4,071,446 | 1/1978 | Kunin | 210/674 |
| 4,107,044 | 8/1978 | Levendusky | 210/266 |
| 4,123,324 | 10/1978 | Sanada et al. | 176/37 |
| 4,303,704 | 12/1981 | Courduvelis et al. | 210/670 |
| 4,372,858 | 2/1983 | Ritter | 210/674 |
| 4,414,183 | 11/1983 | Sasaki et al. | 423/7 |
| 4,442,231 | 4/1984 | Kataoka et al. | 521/32 |
| 4,818,773 | 4/1989 | Cornette et al. | 521/32 |
| 4,880,595 | 11/1989 | Matsuda et al. | 376/313 |

FOREIGN PATENT DOCUMENTS

| | | |
|---|---|---|
| 0132902 | 2/1985 | European Pat. Off. . |
| 1430776 | 4/1976 | United Kingdom . |
| 2144111 | 2/1985 | United Kingdom . |

OTHER PUBLICATIONS

Patent Abstracts of Japan, Jan. 21, 1984 & JP–A–58 181 730 (Unitika) Oct. 24, 1983.
Patent Abstracts of Japan, Dec. 15, 1983 & JP–A–58 161 926 (Sumitomo) Sep. 26, 1983.
Database WPIL, Derwent Publications Ltd., London, GB; AN 84–276463 & DD–A–211 352 (Sabrowski) Nov. 10, 1982 abstract.
Patent Abstracts of Japan, Aug. 23, 1980 & JP–A–55 076 031 (Yamada) Jun. 7, 1980.
Catalog on DUOLITE™–Brine Purification entitled "Ion Exchange Purification of Feed Brine for Chlor–Alkali Electrolysis Cells" by J. J. Wolff, Mar. 1985.
PUROLITE™ S–940 "Technical Data" document, Macroporous Aminophosphonic Chelating Resin Especially for decacification of brine solutions.
PUROLITE™ S–950 "Technical Data" document, Macroporous Aminophosphonic Chelating Resin for the selective removal of toxic metal from aqueous solutions.

*Primary Examiner*—Ivars Cintins
*Attorney, Agent, or Firm*—Ira Lee Zebrak

[57] ABSTRACT

A method for removing low levels of heavy metal from chemical/industrial waste streams containing interfering anions which typically form strong complexes with heavy metals such as uranium utilizes an ion exchange resin having amino-phosphonic functional groups which selectively capture the heavy metal from the chemical waste stream in an efficient manner such that the amount of heavy metal in the waste stream is reduced to sub-ppm levels. After capture, the resin is treated with a sequestering agent, such as a solution of ammonium fluoride or ammonium sulfate, which releases the heavy metal from the resin. The resin is then regenerated with a sodium solution and returned to service. Utilizing ion exchange and a resin containing amino-phosphonic functional groups allows removal of heavy metal to a level of less than or equal to 0.1 ppm which is a substantial reduction in view of the presence of significant quantities of complexing anions in the waste stream.

16 Claims, No Drawings

METHOD FOR REMOVING A HEAVY METAL FROM A WASTE STREAM

TECHNICAL FIELD

This invention relates to methods for selectively removing a heavy metal from an aqueous waste stream and more particularly to methods for reducing the heavy metal content in the waste stream to sub-ppm levels.

BACKGROUND

A low level concentration of a heavy metal, in the ppm range, is often difficult to remove from an aqueous chemical waste effluent. For example, waste effluent from uranium processing may contain about 1–150 ppm uranium. Various methods are available to reduce uranium levels to about 150 ppm by using, for example, a precipitation or solvent extraction process. However, the lower the level of uranium, the more difficult it is to remove. This is particularly true when removal is desired to sub-ppm levels, for example to a level of equal to or less than 0.1 ppm.

Aqueous waste in particular is difficult to treat to remove the heavy metal such as uranium to sub ppm levels as such a waste stream typically contains other waste components such as sulfates, nitrates, fluorides, chlorides and carbonates, which act as complexing anions and form strong complexes with heavy metals. These anions may be present in amounts of up to or over 20 g/l fluoride, 75 g/l sulfate, 50 g/l nitrate, 200 g/l chloride, 1200 ppm total carbonate. This makes the removal of a heavy metal to sub-ppm levels nearly impossible to achieve by conventional processes such as precipitation, solvent extraction or ion exchange. There are no known commercial processes which will reduce the concentration of a heavy metal such as uranium to sub-ppm levels on a plant process scale from such solutions. Even conventional strong acid or weak acid cation resins are not effective if complexing anions are present above a few hundred ppm in concentration.

One method currently under consideration is the use of a concentrated sodium silicate precipitation process. This involves adding concentrated sodium silicate to the waste stream, precipitation of the sodium silicate to scavenge the heavy metal from the waste stream and filtration to remove the precipitate which is either treated to release the heavy metal for recycle or disposed of. Such a process is complex and requires expensive solids handling steps.

SUMMARY OF THE INVENTION

It is an object of the present invention to provide a method for selectively reducing the heavy metal content of a waste stream to sub-ppm levels.

It is a further object to provide an ion exchange process which uses a chelating resin containing amino-phosphonic functional groups for selectively removing a heavy metal from a waste stream containing complexing anions.

It is a further object to provide a method which is effective for reducing the uranium content of a waste stream to very low levels on a plant scale.

These and other objects of the present invention are achieved by providing a method for removing heavy metal ions from a waste stream containing complexing anions comprising providing an ion exchange resin containing amino-phosphonic functional groups for capturing the heavy metal ions, contacting the resin with the waste stream to remove the heavy metal ions to sub ppm levels, contacting the heavy metal containing resin with an eluting agent to release the captured heavy metal ions, and regenerating the resin for return to service.

Preferably, a chelating resin containing amino-phosphonic functional groups such as DUOLITET™C-467 produced by Rohm and Haas Company or PUROLITE™S-940, or S-950, made by the Purolite Company may be used. Such resins are found to selectively remove the heavy metals, such as uranium, to sub-ppm levels in the presence of high levels of complexing ions, though such resins were not previously known for this purpose.

DETAILED DESCRIPTION OF THE INVENTION

The process for reducing heavy metals to sub-ppm levels utilizes a chelating resin effective in removing such heavy metals in the presence of complexing anions. For purposes of this disclosure, the term "heavy metal" includes, at least uranium, zinc, nickel, cobalt, beryllium, lead, tungsten, vanadium and molybdenum. However, the inventive process is particularly useful in removing uranium from waste streams.

A preferred chelating resin has an amino-phosphonic functional group as the exchange site. The group is represented as follows; $-NH-CH_2-PO_3Na_2$. Such a resin undergoes the following reactions during ion exchange:

$$2RCH_2NHCH_2PO_3Na_2 + M^{++} \rightarrow (RCH_2NHCH_2PO_3)_2MNa_2 + 2Na^+ \quad \text{I}$$

$$(RCH_2NHCH_2PO_3)_2MNa_2 + 4NH_4F \rightarrow 2RCH_2NHCH_2PO_3(NH_4)_2 + MF_4^= + 2Na^+ \quad \text{II}$$

$$RCH_2NHCH_2PO_3(NH_4)_2 + 2NaOH \rightarrow RCH_2NHCH_2PO_3Na_2 + 2NH_4^+ \quad \text{III}$$

Equation I represents the metal ion complexing reaction, Equation II represents the metal ion release reaction and Equation III represents the regeneration reaction. For exemplary purposes, ammonium fluoride is used as the sequestering agent, and M is a heavy metal.

After complexing, the resin is treated with an eluting agent to release the captured heavy metal and is then regenerated with an alkali metal hydroxide solution or other appropriate regenerant to return the resin to its original state for additional service.

Preferably, the resin polymer (R) is a vinyl aromatic copolymer, preferably cross linked polystyrene and more preferably a polystyrene divinylbenzene copolymer, though other polymers having the amino-phosphonic functional group may be used.

The resin is typically used in bead form and loaded into a column. The waste stream is passed through the column, contacting the resin beads. During contact, the heavy metal ions in the waste stream react with the functional group according to Equation I and an exchange occurs where the heavy metal ion forms a complex with the resin and sodium ion is released. Contact is maintained until a threshold level is reached i.e. the breakthrough concentration. At this breakthrough point, the process reaches an equilibrium where additional heavy metal cannot be removed effectively. The flow is halted and the column is backwashed with water, preferably deionized or softened water. By flowing in reverse, the resin is fluidized and solids captured by the beads are loosened and removed.

To remove the heavy metal from the resin beads, a strong sequestering agent is required, as is the case where the heavy metal is uranium. The applicable sequestering agent depends on the chemistry of the target heavy metal. For uranium, the sequestering agent is preferably ammonium fluoride, ammonium sulfate, a mixture of both or a concentrated alkali metal or ammonium carbonate solution, such as about a 0.5–1.0 molar sodium carbonate solution. Mineral acid solutions, such as hydrochloric or sulfuric acid, may elute some heavy metals from the resin but they will not elute others such as uranium. Uranium has been eluted successfully with a high ionic strength solution of ammonium fluoride such as about a 2.5–3.0 molar solution. Other solutions used include about 0.5–1.0 molar sodium carbonate and a mixture of about 2.5 molar ammonium fluoride and about 1.5 molar ammonium sulfate.

While strong mineral acid solutions will not elute uranium from the resin, treatment of the resin with three to five volumes of a dilute mineral acid, such as about 5% sulfuric acid or about 10% hydrochloric acid, followed by a water rinse prior to introduction of the sequestering agent, does increase the efficiency of uranium elution. Following the heavy metal elution operation, the bed is rinsed with water and the resin regenerated back to the original ionic form, e.g. to the sodium form with a dilute sodium hydroxide solution. The resin bed is then ready for a new loading cycle.

EXAMPLE I

A solution containing about 0.2–0.5 M sodium fluoride, up to 0.1 M sodium chloride, up to 0.2 M sodium nitrate, up to 0.1 M sodium sulfate, 0.5–5 ppm uranium, up to 800 ppm carbonate and having a pH of 8–12, was passed through a column containing DUOLITE™C-467 resin.

The test column was made of glass and had an I.D. of 2.0 cm. The resin bed had a volume of 0.12 L and a height of 36 cm. The loading feed rate was 8 bed volumes (BVs) per hour. The temperature was ambient (about 20° C.). The average uranium concentration in the feed was 1.2 ppm. After treatment, the uranium content was reduced to less than or equal to 0.1 ppm.

Uranium breakthrough occurred at approximately 5000 BVs, thus demonstrating a loading cycle length of approximately 26 days. After uranium breakthrough, the column was rinsed with water to remove the remaining feed solution and then the resin bed was backwashed/fluidized with water to remove any solids that may have collected in the bed from the feed solution.

Dilute mineral acid (0.5 M sulfuric acid) was then passed through the column. The acid treatment is optional, but makes the uranium elution step more efficient. The acid in the column was then rinsed from the column with water and the eluant (mixture of 2.5 M ammonium fluoride-2M ammonium sulfate) was introduced into the column at a rate of 3 BV/hr. Twenty five bed volumes of eluant removed all of the uranium from the resin bed. Residual eluant was rinsed from the bed with water and the resin was converted back to the sodium form with 0.5 M sodium hydroxide. The residual sodium hydroxide solution was rinsed from the column and the resin bed was fluidized with water in preparation for the next loading cycle. Total elution/regeneration time was about 15 hours.

EXAMPLE II 118 liters of a solution containing approximately 0.6 M ammonium fluoride, 2 M ammonium hydroxide and 0.4 M ammonium nitrate and having about 0.7–1.5 ppm uranium was passed through the same column as Example I containing 0.12 L of DUOLITE™C-467 resin. The solution flow rate was 10 BVs per hour and the test was conducted at 20° C. After treatment, the effluent from the column had a uranium content less than or equal to 0.1 ppm.

EXAMPLE III

Two solutions containing approximately 0.6 M sodium fluoride, 0.4 M sodium nitrate, 0–0.5 M sodium sulfate, 0.6–2 ppm uranium and having a pH in the range of 8–12 were passed through the same column as Example I containing DUOLITE™C-467 resin. The solution flow rates were 10 and 15 BVs per hour, with 350 and 880 liters of feed solution respectively, and the tests were conducted at 40° C. After treatment, the uranium content in each effluent was reduced to less than or equal to 0.1 ppm.

The process of the invention is effective in the presence of up to 20 g/l fluoride, 75 g/l sulfate, 500 g/l nitrate, 210 g/l chloride, 1200 ppm total carbonate at ph 7–8.5 and 800 ppm total carbonate at ph 8.5–12. In all cases uranium content was reduced to less than or equal to 0.1 ppm in the ion exchange column effluent, and these are not believed to be the upper limits in complexing anion concentrations at which the process will operate. These are merely exemplary of the ability of the process to operate successfully in the presence of complexing anions.

It has been demonstrated that the inventive resin will remove uranium down to 0.1 ppm or less from a solution having a pH of 8 and containing 0.9 M sulfate, 1 M fluoride, 1 M nitrate and 130 ppm uranium. Thus, it is believed that 130 ppm is not an upper limit from the standpoint of the resin's ability to remove a heavy metal from solution, and it is furthermore believed that higher concentrations could be effectively treated.

Additionally, the inventive process allows for recovery and return of the captured uranium for reprocessing, without requiring any solids handling equipment.

Laboratory scale ion exchange column tests for removal of uranium from solutions of the types described in Examples I, II, and III were conducted with several other types of ion exchange resins. The following types of resins all proved ineffective at reducing uranium to the level of less than 1 ppm in these types of solutions; a macroporous strongly acidic cation resin with sulfonic acid functional group; a macroporous weakly acidic cation resin with carboxylic acid functional groups; a chelating resin with iminodiacetic acid functional groups; a chelating resin with amidoxime functional groups; and a chelating resin with polyamine functional groups.

Utilizing the above referenced method allows treatment of chemical waste streams to remove low levels of uranium or another heavy metal to an acceptable level for release and further treatment in a municipal treatment system. Consequently, the process also has significant advantages for treating chemical waste streams prior to discharge and is particularly advantageous as the process is a simple one step operation, and the use of the inventive process is a significant advance in the art. While it is preferred to utilize the inventive method as a finishing step to waste treatment, it is believed that the inventive method could perform both the bulk removal of heavy metal ion and the fine finishing removal in one operation. Consequently, waste streams containing greater than 130 ppm heavy metal can be processed by the present invention.

While a preferred embodiment of the present invention has been shown and described, it will be understood by those skilled in the art that various changes or modifications could be made without varying from the scope of the present invention. Thus, for example, the type of column, bead size, eluting agents, temperatures of operation etc. can be determined by those skilled in the art and such modifications of the process do riot vary from the scope of the invention.

I claim:

1. A method for removing heavy metal ions from a waste stream containing a plurality of complexing anions selected from the group consisting of sulfates, nitrates, fluorides, chlorides and carbonates, the method comprising; providing a chelating resin containing amino-phosphonic groups for capturing the heavy metal ions, contacting the resin with the waste stream to reduce the heavy metal ions concentration to less than 1 ppm, eluting the resin by contact with a sequestering agent and, regenerating the resin for another cycle.

2. The method of claim 1 wherein the chelating resin is a styrene divinylbenzene copolymer having amino-phosphonic functional groups.

3. The method of claim 1 wherein the chelating resin is a cross linked polystyrene polymer having amino-phosphonic functional groups.

4. The method of claim 1 wherein the sequestering agent is selected from the group consisting of ammonium fluoride, ammonium sulfate, alkali metal or ammonium carbonate and mixtures thereof.

5. The method of claim 1 further comprising treating the resin with a dilute mineral acid prior to contacting with the sequestering agent.

6. The method of claim 1 wherein the waste stream has an initial heavy metal concentration of 1–130 ppm.

7. The method of claim 1 wherein the waste stream has an initial heavy metal concentration of 1–50 ppm.

8. The method of claim 1 wherein the waste stream after treatment contains a heavy metal concentration of less than or equal to 0.1 ppm.

9. A method for removing heavy metal ions from a waste stream containing complexing anions comprising;

providing a chelating resin containing amino phosphonic groups for capturing the heavy metal ions, contacting the resin with the waste stream to reduce the heavy metal ion concentration to less than 1 ppm, eluting the resin by contact with a sequestering agent selected from the group consisting of ammonium fluoride, ammonium sulfate, alkali metal or ammonium carbonate and mixtures thereof, and, regenerating the resin for another cycle.

10. The method of claim 9 wherein the chelating resin is a styrene divinylbenzene copolymer having amino-phosphonic functional groups.

11. The method of claim 9 wherein the chelating resin is a cross linked polystyrene polymer having amino-phosphonic functional groups.

12. The method of claim 9 further comprising treating the resin with a dilute mineral acid prior to contacting with the sequestering agent.

13. The method of claim 9 wherein the waste stream has an initial heavy metal concentration of 1–130 ppm.

14. The method of claim 9 wherein the waste stream has an initial heavy metal concentration of 1–50 ppm.

15. The method of claim 9 wherein the waste stream after treatment contains a heavy metal concentration of less than or equal to 0.1 ppm.

16. A method for removing heavy metal ions from a waste stream containing complexing anions comprising;

providing a chelating resin containing amino phosphonic groups for capturing the heavy metal ions, contacting the resin with the waste stream to reduce the heavy metal ions concentration to a level of less than or equal to 0.1 ppm, eluting the resin by contact with a sequestering agent and, regenerating the resin for another cycle.

* * * * *